United States Patent
Ishii

(10) Patent No.: US 7,570,546 B2
(45) Date of Patent: Aug. 4, 2009

(54) OPTICAL PICK-UP AND OPTICAL DISK DEVICE

(75) Inventor: Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 11/399,469

(22) Filed: Apr. 7, 2006

(65) Prior Publication Data

US 2006/0233090 A1 Oct. 19, 2006

(30) Foreign Application Priority Data

Apr. 14, 2005 (JP) ............... 2005-116913

(51) Int. Cl.
*G11B 7/00* (2006.01)
(52) U.S. Cl. .................. 369/44.14
(58) Field of Classification Search ......... 369/44.14, 369/44.15, 44.16, 44.22; 359/811–813, 819, 359/822, 823
See application file for complete search history.

(56) References Cited

U.S. PATENT DOCUMENTS

| 5,781,351 A * | 7/1998 | Murakami et al. ..... 359/819 |
| 6,501,605 B2 * | 12/2002 | Moriya ..... 359/819 |
| 6,683,732 B2 * | 1/2004 | Maeda et al. ..... 359/811 |
| 6,781,926 B2 * | 8/2004 | Ishizaki et al. ..... 369/13.13 |
| 7,224,542 B2 * | 5/2007 | Kuchimaru ..... 359/811 |
| 2005/0281148 A1 | 12/2005 | Ishii |
| 2007/0047423 A1 | 3/2007 | Ishii |

FOREIGN PATENT DOCUMENTS

| JP | 5-189785 | 7/1993 |
| JP | 10-221583 | 8/1998 |

* cited by examiner

*Primary Examiner*—Thang V Tran
(74) *Attorney, Agent, or Firm*—Fitzpatrick, Cella, Harper & Scinto

(57) ABSTRACT

An optical pick-up including an objective lens for collecting/irradiating laser light onto an optical disk, and an objective lens holding member for holding the objective lens. A plurality of cutout portions for injecting therein an adhesive for fixing the objective lens are provided on a side of the objective lens holding member opposite to a side thereof facing the optical disk and at the cut out portions. An adhesive is filled in a gap between a surface of the edge of the objective lens perpendicular to the optical disk and a portion of the objective lens holding member opposing the surface. A projection member is disposed on a surface of the edge opposing the optical disk and on a side of the gap opposing the optical disk.

6 Claims, 7 Drawing Sheets

OPTICAL PICK-UP AND OPTICAL DISK DEVICE

This application claims priority from Japanese Patent Application No. 2005-116913, filed on Apr. 14, 2005, which is hereby incorporated by reference herein.

BACKGROUND OF THE INVENTION

1. Field of the Invention

The present invention relates to an optical pick-up having an objective lens for collecting laser light onto an optical disk, and an optical disk device, which collects laser light on an information signal recording layer provided in an optical disk using the optical pick-up to perform the recording and/or reproduction of an information signal.

2. Related Background Art

Hitherto, there has been put to practical use an optical disk device that collects laser light into a fine light spot on an information signal recording layer of an optical disk by using an optical pick-up with an objective lens, to thereby record an information signal, or one that reproduces a recorded information signal from reflected light thereof. Then, in recent years, in such an optical disk device, it has become possible to raise the numerical aperture (NA) to 0.8, or more, by improvement in the design and manufacturing techniques of an objective lens. By using such an objective lens with a high NA, it is possible to form a finer light spot, to thereby improve the resolution in the recording and/or reproduction, thus, increasing the capacity of the optical disk.

Conventionally, a typical optical disk has an information signal recording layer formed on a substrate of a 0.6 mm to 1.2 mm thickness, which is composed of a transparent resin material. Further, the optical disk device irradiates laser light through the substrate onto the information signal recording layer. However, an objective lens having a higher NA has a shorter focal length, requiring a shorter distance between the objective lens and the information signal recording layer, which makes it difficult to focus laser light through the substrate of a 0.6 mm to 1.2 mm thickness onto the information signal recording layer. Therefore, a proposal has been to make the NA of an objective lens high, and, at the same time, to employ an optical disk having a transparent cover layer thinner than a substrate formed on an information signal recording layer, and to irradiate laser light on an information signal recording layer through the cover layer.

FIG. 8 is a schematic view showing the configuration of such an optical disk device. Here, reference numeral 1 denotes an optical disk, reference numeral 2 denotes an optical pick-up, and reference numeral 3 denotes a spindle motor, which rotates/drives the optical disk 1. The optical pick-up 2 is constructed of a laser light source 6, a collimator lens 7, a beam splitter 8, a collector lens 9, a photodetector 10, an objective lens 20, and an actuator 11, which performs focus control and tracking control of the objective lens 20.

The optical disk 1 is constructed of a substrate 12, an information signal recording layer 13, which is formed on the substrate 12 and consists of a phase changeable material, which is capable of reversibly changing the phase state, and a cover layer 14 having a thickness of about 0.1 mm, which is made of a transparent resin material. On the information signal recording layer 13, a spiral-shaped track or concentric ring-shaped tracks are formed. Incidentally, the information signal recording layer 13 may be made of a magnetooptical recording material or constituted by a metal reflective film having pits (unevenness) formed thereon. Moreover, the optical pick-up 2 is disposed on the cover layer 14 side of the optical disk 1.

FIG. 7 is a schematic view showing the configuration of an actuator 11. The actuator 11 is constructed of a stationary part 15 and a movable part 16. The stationary part 15 is constructed by permanent magnets 17a, 17b, a yoke 18, and a support mount 19. The movable part 16 is a constructed by an objective lens 20, a focus coil 21, a tracking coil 22, and a lens holding member 23 for holding these. Elastic support members 24a, 24b, 24c, 24d each have a linear shape, elasticity, and a high electroconductivity. One end thereof is fixed to the support mount 19, and the other end thereof holds the movable part 16, so as to be freely displaceable in a direction perpendicular to the optical disk 1 surface and in the radial direction of the optical disk 1. In addition, the elastic support members 24a, 24b, 24c, 24d are elastically connected to the focus coil 21 and the tracking coil 22 in the lens holding member 23.

FIGS. 6A and 6B show an objective lens holding structure in the lens holding material 23. FIG. 6A is a plan view (as seen from the optical disk 1 side), and FIG. 6B is a longitudinal cross-sectional view of FIG. 6A. In the lens holding member 23, a through-hole 30, for disposing the objective lens 20, is formed, and there are formed a step-shaped abutting surface 31 on the inner wall surface of the hole 30 and an aperture 32 for restricting the diameter of a light flux at a lower portion of the hole 30. Furthermore, cutout portions 33a, 33b, 33c for adhesion are formed in the upper surface of the lens holding member 23 at the periphery of the hole 30. On the other hand, in the objective lens 20, an edge 34 (a limb provided at the periphery of an optically effective part) is formed. The objective lens 20 is fitted and provided in the hole 30, and is positioned with the lower surface of the edge 34 being abutted on the abutting surface 31. Furthermore, the objective lens 20 is fixed by injecting an adhesive (shown by hatching) into the cutout portions 33a, 33b, 33c for adhesion, which have an open upper end, and by adhering it to the side surface of the objective lens 20.

Further, as shown in FIG. 8, the optical disk device further has an error signal generating circuit 4 and a control circuit 5 for performing focus control and tracking control of the actuator 11. The control circuit 5 supplies a control current to the focus coil 21 and tracking coil 22 through the elastic support members 24a, 24b, 24c, 24d.

When recording an information signal, first, the optical disk 1 is rotated and driven by the spindle motor 3. With the optical disk being kept rotated, a laser light pulse-modulated in accordance with an information signal generated by the laser light source 6 is made parallel by the collimator lens 7. Further, the parallel light is allowed to pass the beam splitter 8, and is converged by the objective lens 20, to be collected into a fine spot on the information signal recording layer 13 of the optical disk 1 through the cover layer 14.

The information signal recording layer 13 of the optical disk 1 is heated and cooled repeatedly by irradiation of the pulse-modulated laser light. Recording marks, having their phase states changed in an amorphous phase or a crystalline phase, depending on a difference in such a process, are formed as an information signal.

In addition, also when reproducing an information signal, similarly, the optical disk 1 is rotated and driven by the spindle motor 3. In this state, laser light, having a fixed intensity generated by the laser light source 6, is irradiated, so as to be collected into a fine light spot on the information signal recording layer 13 of the optical disk 1 through the cover layer 14. Since the intensity of reflected light from the information signal recording layer 13 at this time will vary depending on the recording marks, an information signal is reproduced thereby.

During such a recording and reproduction operation of an information signal, an optical beam reflected by the optical disk 1 is reflected by the beam splitter 8, and then collected by the collector lens 9, to be detected by the photodetector 10. The photodetector 10 is equipped with light-receiving surfaces divided into a plurality of sections, and the error signal generating circuit 4 generates a focus error signal and a tracking error signal from a detection signal of the respective light-receiving surfaces.

Furthermore, the control circuit 5 supplies a control current, based on this focus error signal and tracking error signal to the focus coil 21 and tracking coil 22, through the elastic support members 24a, 24b, 24c, 24d. The actuator 11 drives the movable part 16 in a direction perpendicular to the surface of the optical disk 1 and in a radial direction, which is at right angles to the recording tracks by an electromagnetic force generated between this control current and magnetic flux generated by the permanent magnets 17a, 17b.

Thus, even if the optical disk 1 is displaced in the perpendicular direction by surface runout, the light spot is focus-controlled, so as to follow the displacement to be accurately collected on a recording track. In addition, even if a recording track is displaced in the radial direction by decentering, the light spot is tracking-controlled, so as to follow the displacement, to perform scanning.

As described above, the spacing (working distance) between the objective lens 20 and the cover layer 14 surface tends to be reduced in recent years, accompanying the increase in the NA of the objective lens 20. Furthermore, to meet the demand for size reduction of optical disk devices, it is also desired to reduce the size of the objective lens 20, so that it is actually considered to set the working distance thereof to 0.1-0.3 mm.

When the actuator is normally controlled to operate, a given distance is kept between the objective lens 20 and the cover layer 14 surface. However, there are cases when a sudden shock or vibration, or contamination, or a scratch on the optical disk 1, makes it impossible to provide a normal error signal, whereby the actuator 11 may become out of control. At the time of such an abnormal operation, it is unavoidable that the movable part 16 is excessively displaced to come into contact with the optical disk 1.

In addition, in particular, in an optical disk device used for portable equipment, the frequency increases, such that even when not operating, a movable part vibrates by any vibration, shock, or the like, from outside, to come into contact with an optical disk. In such a case, if the objective lens 20 and the optical disk 1 are brought into direct contact with each other, there are cases where either of the members is damaged, so that the recording/reproduction of a normal information signal may become impossible.

Therefore, to solve such a problem, there is proposed, in Japanese Patent Application Laid-Open No. H10-221583, a method of providing a protection member at a periphery of an objective lens as a buffer material for protecting the objective lens. FIG. 9 is a cross-sectional view showing the configuration of the protection member of an optical pick-up described in the above-mentioned official gazette. Reference numeral 35 denotes a protection member provided on an edge 34 of an objective lens 20. The upper surface of the protection member 35, which faces the optical disk 1, is made of a material having a low hardness and slide resistance. Further, the upper surface is at least higher than a vertex of the objective lens 20, and is positioned within the range of the working distance. Hence, the protection member 35 will not contact the optical disk 1 during normal operation, but may come into contact with the optical disk 1 at a time of abnormal operation, whereby, at this time, the objective lens 20 is protected without directly contacting the optical disk 1.

However, the above-mentioned official gazette does not disclose any assembly method of the objective lens holding system. As with the optical pick-up shown in Japanese Patent Application Laid-Open No. H05-189785, an adhesive is injected into cutout portions for an adhesion formed in a lens holding member, and then is adhered to an exposed side surface of an edge of an objective lens. Further, a protection member is similarly fixed using an adhesive. Therefore, the adhesive used for fixing the objective lens and protection member to the lens holding member may run out when applied, even in a slightly excessive amount. As a result, the adhesive may adhere to the disk-side surfaces of the objective lens and the protection member accidentally.

The adhesive adhering to the objective lens or protection member is, generally, not made of a material having a low hardness and slide resistance, unlike the protection member, so that collision between the adhesive adhering to the objective lens or protection member and the disk may damage the disk.

SUMMARY OF THE INVENTION

It is, therefore, an object of the present invention to reduce attachment of an adhesive to a disk-side surface of a protection member or an objective lens during an adhesion step.

According to a first aspect of the present invention, an optical pick-up is provided, comprising:

an objective lens for collecting/irradiating laser light onto an optical disk, and an objective lens holding member for holding the objective lens, wherein a plurality of cutout portions for injecting therein an adhesive for fixing the objective lens are provided on a side of the objective lens holding member opposite to a side thereof facing the optical disk.

According to a second aspect of the present invention, an optical disk device is provided, comprising:

a spindle motor for rotating/driving an optical disk, a laser light source for generating laser light, an objective lens for collecting/irradiating the laser light onto the optical disk, and an objective lens holding member for holding the objective lens, wherein a plurality of cutout portions for injecting therein an adhesive for fixing the objective lens are provided on a side of the objective lens holding member opposite to a side thereof facing the optical disk.

DESCRIPTION OF THE PREFERRED EMBODIMENTS

Hereafter, embodiments of the present invention will be described with reference to the attached drawings.

An optical pick-up and an optical disk device according to the present invention will be explained below. Incidentally, since the schematic configuration and operation of the whole optical disk device is the same as that of the conventional device shown in FIG. 8, a detailed explanation is omitted, and, in particular, the optical pick-up will be explained.

Figure 5:
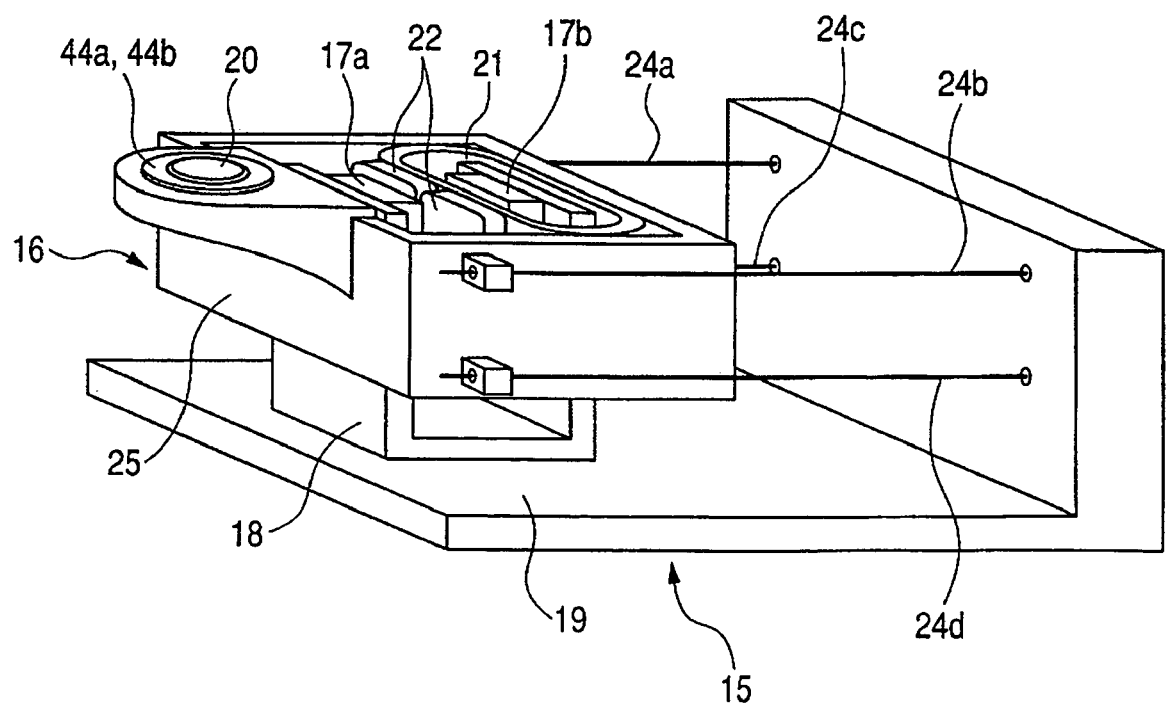
FIG. 5 is a perspective view showing the structure of an actuator of the optical pick-up according to the present invention.
Figure 6A:
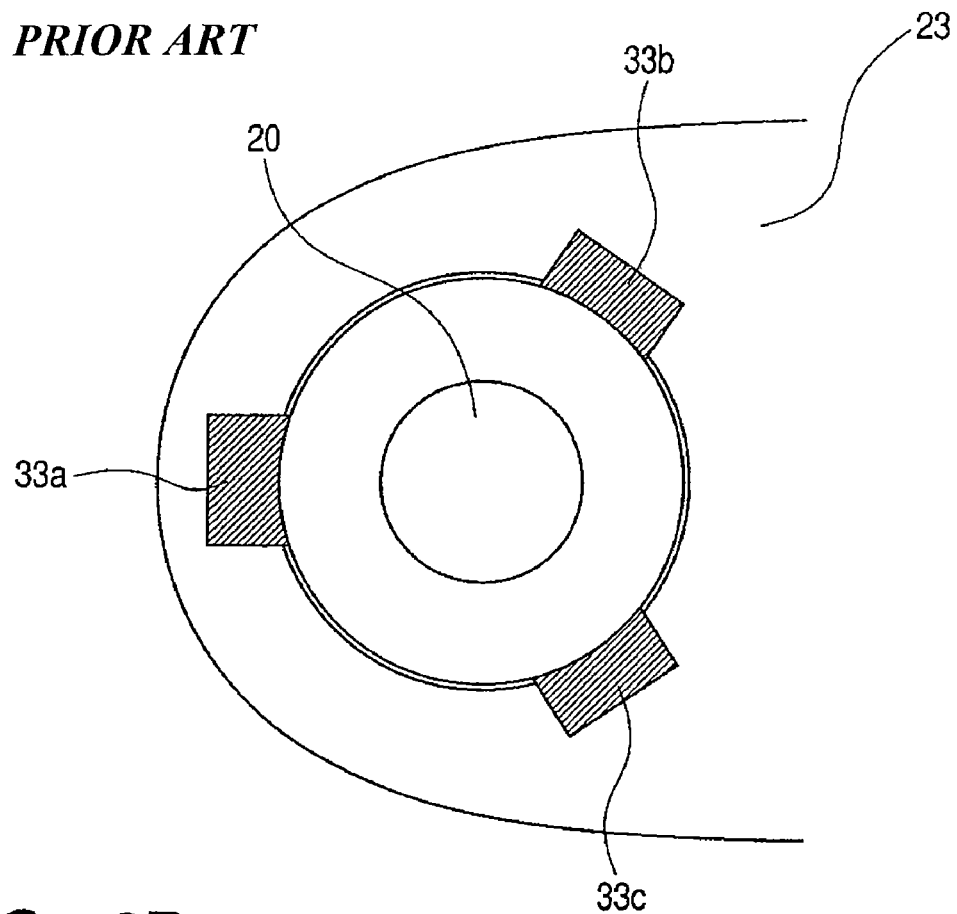
FIGS. 6A and 6B are a plan view and a cross-sectional view, showing an objective lens holding structure in a conventional optical pick-up, respectively.
Figure 6B:
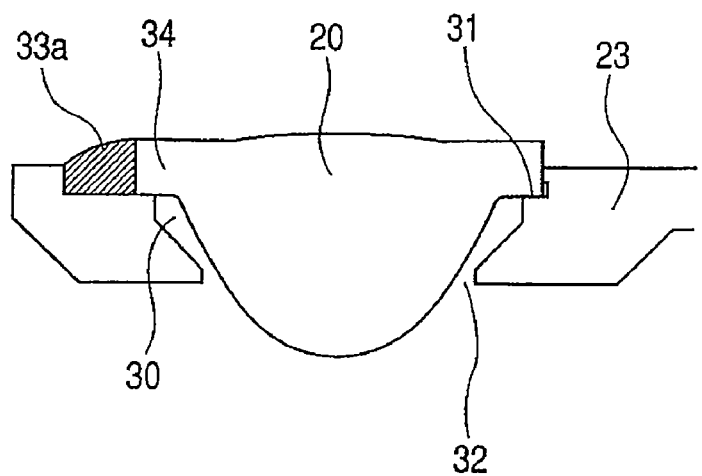
Figure 7:
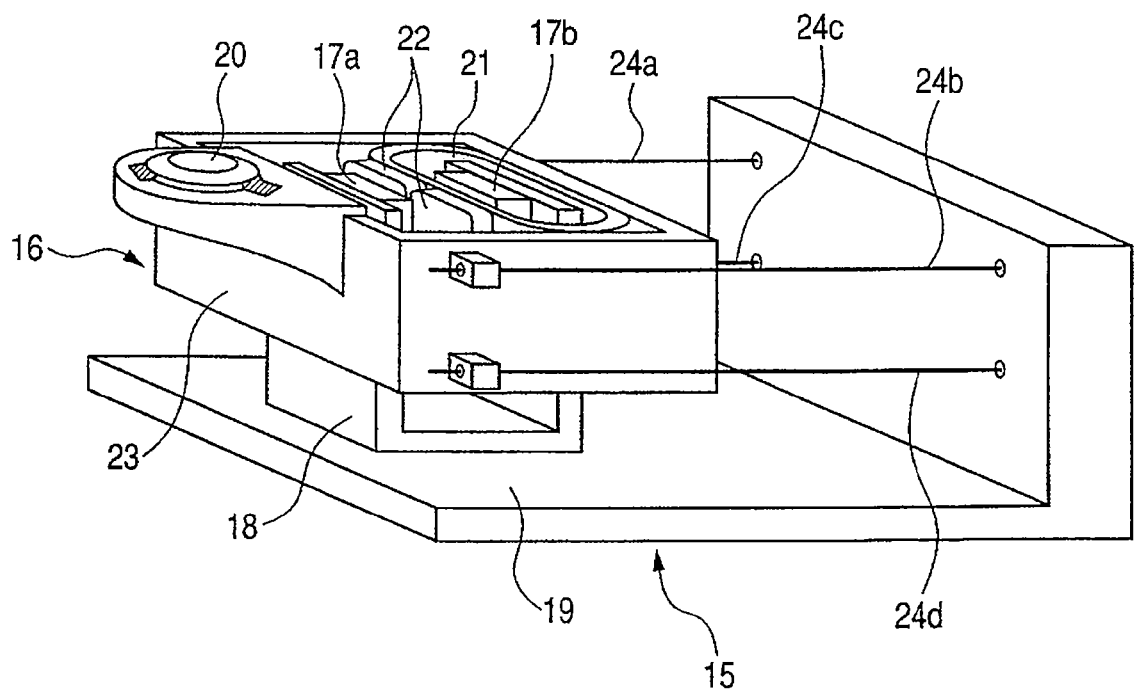
FIG. 7 is a perspective view showing the structure of an actuator of a conventional optical pick-up.

FIG. 5 is a schematic perspective view showing an example of the structure of an actuator 11 (see FIG. 8) of the optical pick-up according to the present invention. The actuator 11 is constructed of a stationary part 15 and a movable part 16. The stationary part 15 is constructed of permanent magnets 17a, 17b, a yoke 18, and a support mount 19. The movable part 16 is constructed of an objective lens 20, a focus coil 21, a tracking coil 22, and a lens holding member 25, which holds these.

Elastic support members 24a, 24b, 24c, 24d each have a linear shape, an elasticity, and a high electroconductivity, and one of the ends thereof are fixed to the support mount 19. The other ends thereof hold the movable part 16, so as to be freely displaceable in a direction perpendicular to the optical disk 1 surface, and in the radial direction of the optical disk 1. In addition, the elastic support members 24a, 24b, 24c, 24d are electrically connected to the focus coil 21 and the tracking coil 22 in the lens holding member 25.

Figure 8:
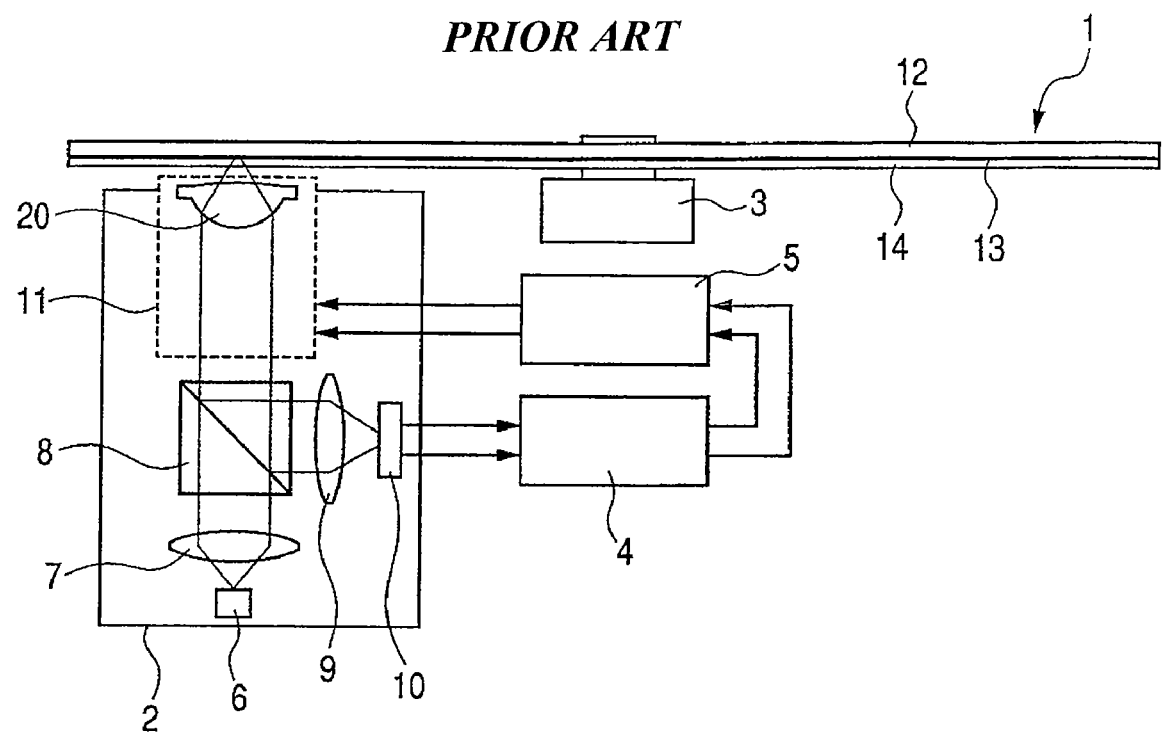
FIG. 8 is a schematic view showing the configuration of an optical disk device.
Figure 9:
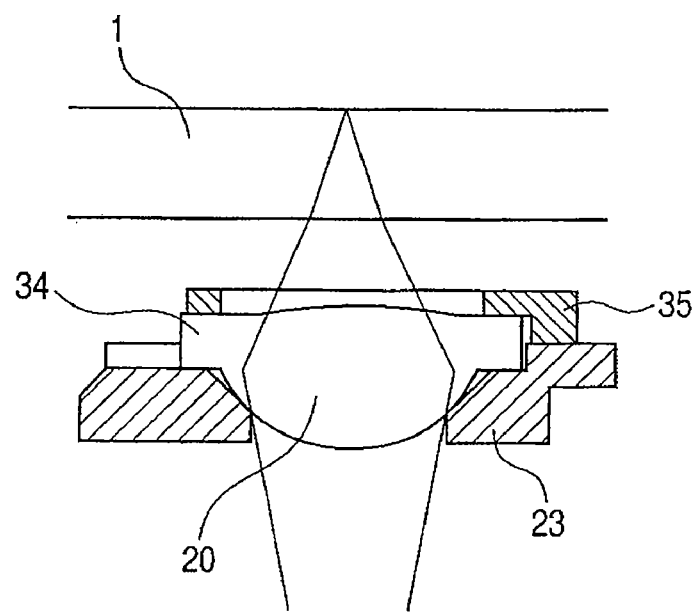
FIG. 9 is a cross-sectional view showing the structure of a protection member in a conventional optical pick-up.

Further, as shown in FIG. 8, the optical disk device has an error signal generating circuit 4 and a control circuit 5 for performing focus control and tracking control of the actuator 11. The control circuit 5 supplies a control current to the focus coil 21 and tracking coil 22 through the elastic support members 24a, 24b, 24c, 24d.

As described below, the objective lens 20 is fixed with an adhesive injected into cutout portions for adhesion (not shown in FIG. 5) formed in the lens holding member 25. The cutout portions for adhesion each have an opening only on a lower surface side of the lens holding member 25, which does not face the optical disk 1. In addition, as shown in FIG. 5, the lens holding member 25 has a protection means for protecting the objective lens 20, which slightly protrudes to the optical disk 1 side more so than the objective lens 20. The protection means may be either a protection part 44a, which is a protruding part of the lens holding member 25, or a protection member 44b, which is a member other than the lens holding member 25, and is attached to the lens holding member 25. The protection means is any one of the following means (1) to (4), and is provided by a method not using an adhesion technique.

(1) The protection means (protection member 44a) is made of the same material as that of the lens holding member 25, and is formed integrally with the lens holding member 25.

(2) The protection means (protector member 44b) is a sheet member having a uniform thickness, on which a self-adhesive layer has been formed beforehand.

(3) The protection means (protector member 44b) is integrated with the lens holding member 25 by being insert-molded into the lens holding member 25.

(4) The protection means (protector member 44b) is engaged with and attached to the lens holding member.

In addition, the protection member 44b can also be used as a closing means for closing an opening on the side of the cutout portion for an adhesion, which faces the optical disk 1.

Here, the spacing (working distance) between the objective lens 20 and the cover layer 14 surface of the optical disk 1 is extremely small, on the order of 0.1 to 0.3 mm. However, when the actuator is normally controlled to operate, a given distance is kept between the objective lens 20 and the cover layer 14 surface. However, there are cases when a sudden shock or vibration, or contamination, or a scratch on the optical disk 1, makes it impossible to provide a normal error signal, whereby the actuator 11 may become out of control. In addition, in particular, in an optical disk device used for portable equipment, the frequency increases, such that even when not operating, a movable part vibrates by any vibrations, shock, or the like, from outside, to come into contact with an optical disk.

When the movable part 16 is excessively displaced in a direction toward the optical disk 1 by vibration and a shock during such an abnormal operation or non-operation, the protection part 44a or the protection member 44b, which protrudes more so than the objective lens 20, will come into contact with the cover layer 14 of the optical disk 1. This not only protects the objective lens 20, but also prevents an occurrence of a sliding scratch on the cover layer 14. Here, the upper surface of the protection part 44a or protection member 44b is made of a material which is excellent in flexibility and slidability, and, on the other hand, the cover layer 14 is made of a material with a high hardness. Furthermore, immediately after detecting such an abnormal operation, the movable part 16 is once moved away from the optical disk, and then an attempt is made to resume the control operation, so that the contact between the protection part 44a or protection member 44b and the optical disk 1 is instantaneous. Therefore, it does not give a serious influence on the reliability of the optical pick-up 2 and the optical disk 1.

EXAMPLES

Hereafter, the lens holding structure, in accordance with the present invention, will be explained in detail with reference to Examples.

Example 1

Figure 1A:
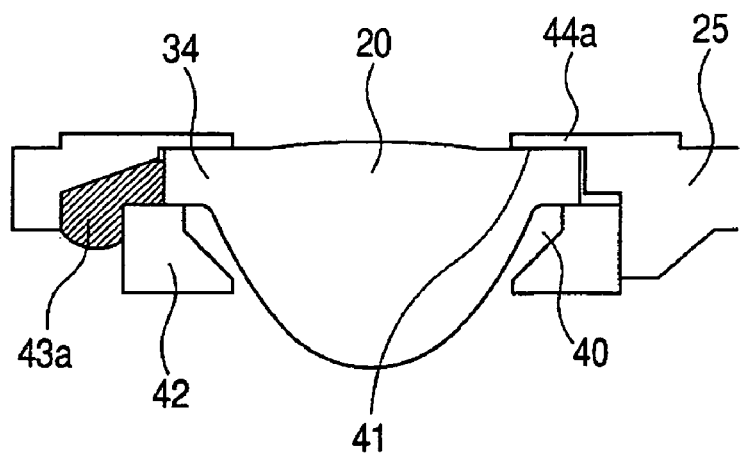
FIGS. 1A and 1B are cross-sectional and bottom views, showing an objective lens holding structure according to Example 1 of the optical pick-up of the present invention, respectively.
Figure 1B:
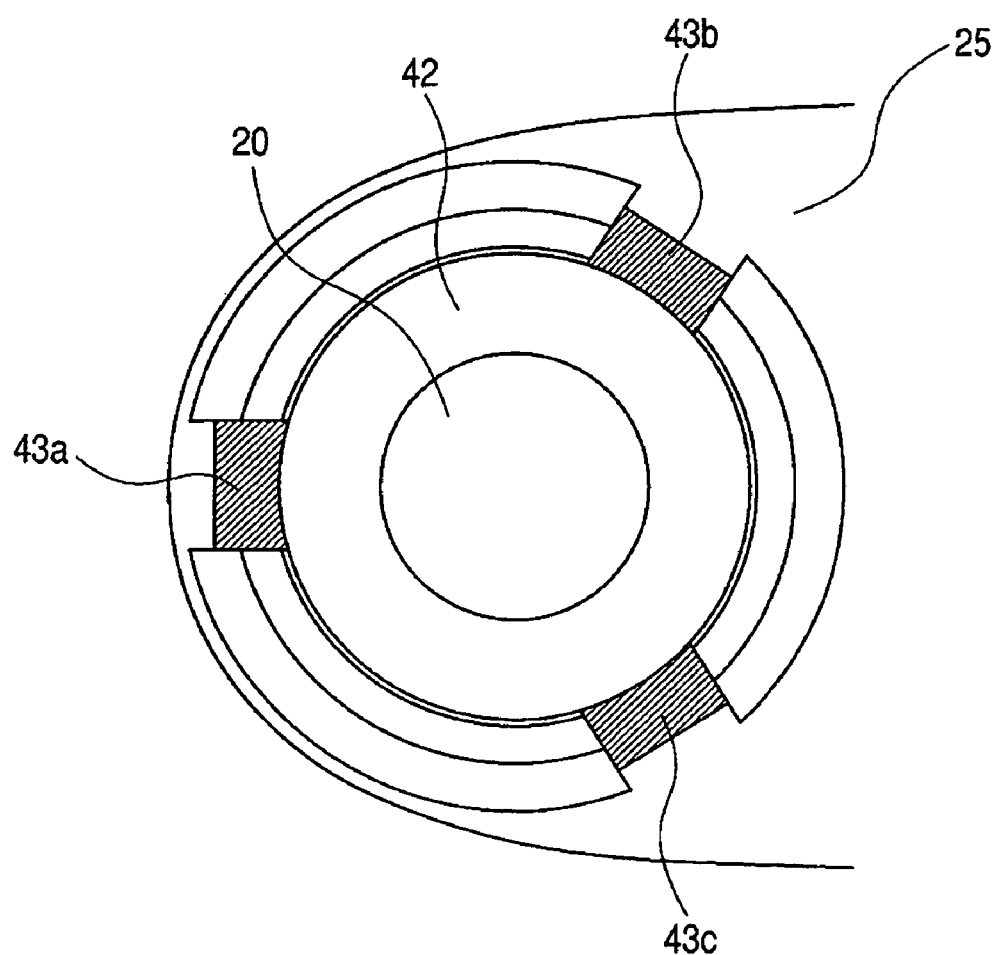

FIGS. 1A and 1B show an objective lens holding structure of Example 1. FIG. 1A is a longitudinal cross-sectional view, and FIG. 1B is a bottom view when viewed from below (i.e., showing a surface which does not face an optical disk).

A through-hole 40 for disposing an objective lens 20 is formed in a lens holding member 25. In the hole 40, an annular aperture member 42, for restricting the diameter of a light flux, which is a member separate from the lens holding member 25, is fitted and provided together with the objective lens 20.

Furthermore, in the present example, a protection part 44a, as protection means for the objective lens 20, is formed integrally with the lens holding member 25, so as to protrude above and inside the hole 40. Simultaneously, a lower surface of the portion of the protection part 44a, protruding into the hole 40, constitutes an abutting surface 41 against the objective lens 20. A coating (or film) made of a material with flexibility and excellent slidability is formed on the upper surface of the protection part 44a. Assuming that the working distance of the objective lens 20 is 0.25 mm and the vertex thereof is higher by 0.05 mm than the upper surface of the edge 34, it is sufficient that the thickness of the protruding portion of the protection part 44a is slightly larger than the vertex height, for example, 0.08 to 0.1 mm. At this time, a clearance of 0.2 to 0.22 mm is assured between the upper surface of the protection part 44a and the cover layer 14 of the optical disk 1.

Furthermore, cutout portions 43a, 43b, 43c for adhesion are formed in a recess shape in a lower surface of the lens holding member 25 at the periphery of the hole 40. The cutout portions 43a, 43b, 43c for adhesion each have an opening only on the lower side thereof, which does not face the optical disk 1, and do not have any opening on the upper side thereof, which faces the optical disk 1.

When assembling the optical pick-up, first, the objective lens 20 and the aperture member 42 are fitted and disposed in the hole 40. Next, the edge 34 is pressed upwardly from below, through the aperture member 42, to thereby abut the upper surface of the edge 34 on the abutting surface 41, and alignment is then performed. In this state, an adhesive (shown by hatching) is injected into the cutout portions 43a, 43b, 43c for adhesion. Then, by adhering the adhesive to the side surface of the objective lens 20, the objective lens 20 is fixed together with the aperture member 42.

Example 2

Figure 2A:
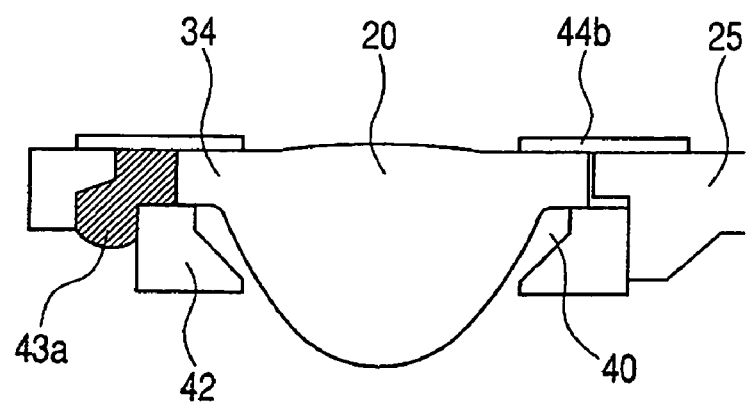
FIGS. 2A and 2B are cross-sectional and bottom views, showing an objective lens holding structure according to Example 2 of the optical pick-up of the present invention, respectively.
Figure 2B:
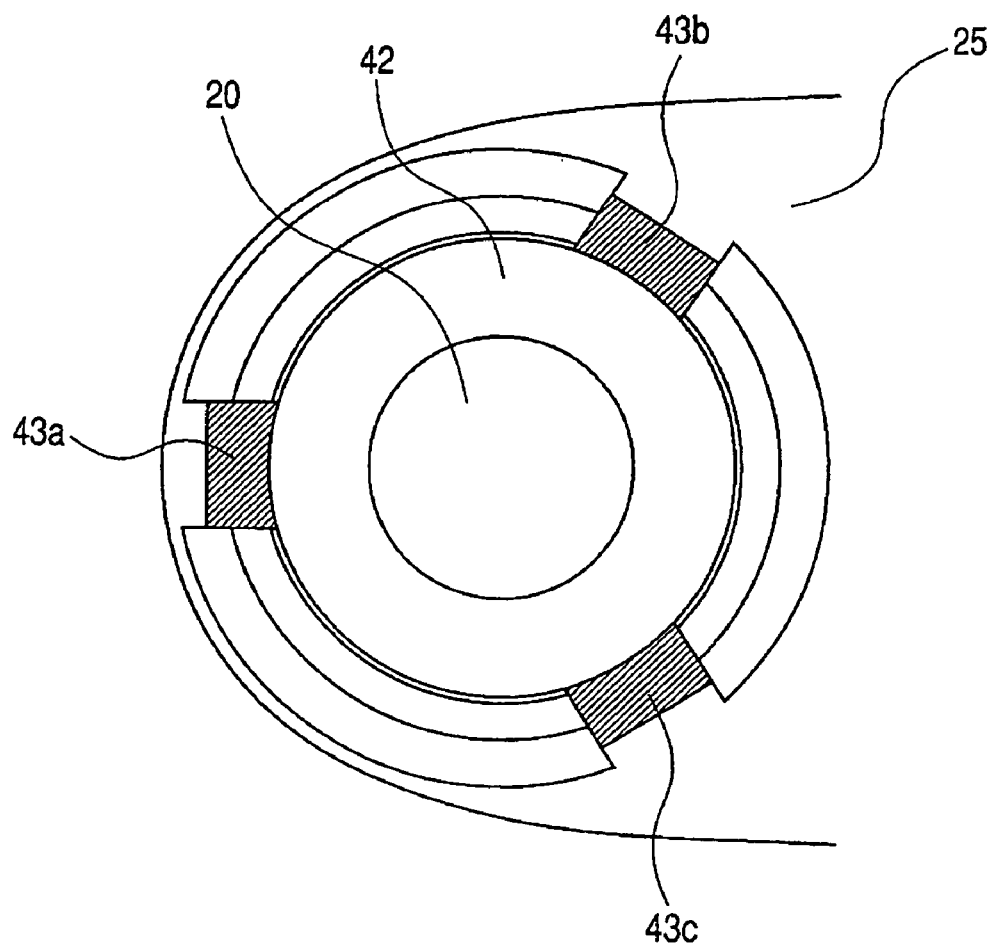

FIGS. 2A and 2B show an objective lens holding structure of Example 2. FIG. 2A is a longitudinal cross-sectional view, and FIG. 2B is a bottom view when viewed from below (i.e., showing a surface which does not face an optical disk).

A through-hole 40 for disposing an objective lens 20 is formed in a lens holding member 25. In the hole 40, an annular aperture member 42 for restricting the diameter of a light flux, which is a member separate from the lens holding member 25, is fitted and provided together with the objective lens 20.

Figure 4:
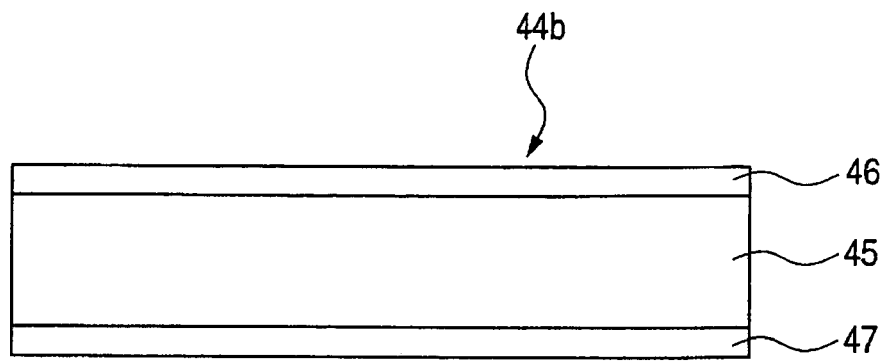
FIG. 4 is a cross-sectional view showing the structure of a protection member in Example 2 of the optical pick-up according to the present invention.

Furthermore, in the present example, an annular protection member 44b, as protection means for the objective lens 20, is bonded to the upper surfaces of the lens holding member 25 and the objective lens 20. FIG. 4 is a cross-sectional view showing the configuration of the protective member 44b. The protection member 44b is a sheet of a uniform thickness, in which a coating 46, made of a material with flexibility and excellent slidability, is formed on the upper surface of a base material 45, made of a thin plate of a metal material or a resin material, and a self-adhesive layer 47 is formed on the lower surface.

Assuming that the working distance of the objective lens 20 is 0.25 mm and the vertex thereof is higher by 0.05 mm than the upper surface of the edge 34, it is sufficient that the thickness of the protection member 44b is slightly larger than the vertex height, for example, 0.08 to 0.1 mm. At this time, a clearance of 0.2 to 0.22 mm is assured between the upper surface of the protection member 44b and the cover layer 14 of the optical disk 1.

The base material 45 of the protection member 44b is a thin plate having a uniform thickness produced by rolling or drawing. Hence, in comparison with a molded product obtained by using a die, or the like, the accuracy of the thickness can be made high, and hence, it is also possible to set the dispersion in the entire thickness of the protection member 44b to be ±0.005 mm or less. When the base material 45 is a metallic material, since its rigidity is higher than that of a resin material, it is also possible to make the base material 45 thinner. In addition, it is possible to form a coating 46 on its surface by a method utilizing the electroconductivity thereof, such as electrodeposition, electroplating, or electrostatic deposition. Furthermore, since its heat resistance is higher than that of a resin material, it is possible to bake the coating 46 at a higher temperature, to thereby increase the adhesion with the base material 45.

Since the protection member 44b has the self-adhesive layer 47 provided beforehand, it is possible to bond the protection member 44b to the lens holding member 25 and the objective lens 20 without using another adhesive. Incidentally, the protection member 44b is bonded so as to extend over the upper surface of the edge 34 and the upper surface of the lens holding member 25, so that the gap between the objective lens 20 and the inner wall of the hole 40, and all the open upper surfaces of the cutout portions 43a, 43b, 43c for adhesion formed as through-holes are closed.

The cutout portions 43a, 43b, 43c for adhesion are formed at the periphery of the hole 40 of the lens holding member 25. The cutout portions 43a, 43b, 43c for adhesion are first formed so as to have open upper surfaces and open lower surfaces. However, as described above, the open upper surfaces which face the optical disk 1 are closed by bonding the protection member 44b.

When assembling the optical pick-up, first, the objective lens 20 and the aperture member 42 are fitted and disposed in the hole 40, and the protection member 44b is bonded to the lens holding member 25. Next, the edge 34 is pressed upwardly from below, through the aperture member 42, to thereby bond the upper surface of the edge 34 to the protection member 44b. Then, an adhesive (shown by hatching) is injected into the cutout portions 43a, 43b, 43c for adhesion, to adhere the adhesion to the side surface of the objective lens 20, whereby the objective lens 20 is fixed together with the aperture member 42.

Example 3

Figure 3A:
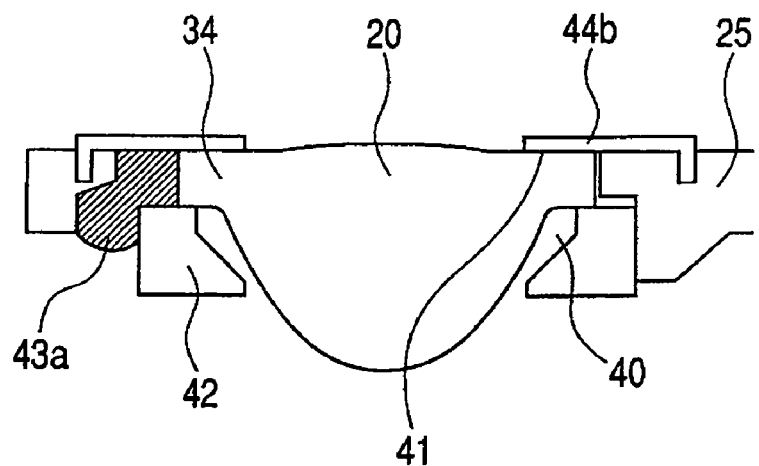
FIGS. 3A and 3B are cross-sectional and bottom views, showing an objective lens holding structure according to Example 3 of the optical pick-up of the present invention, respectively.
Figure 3B:
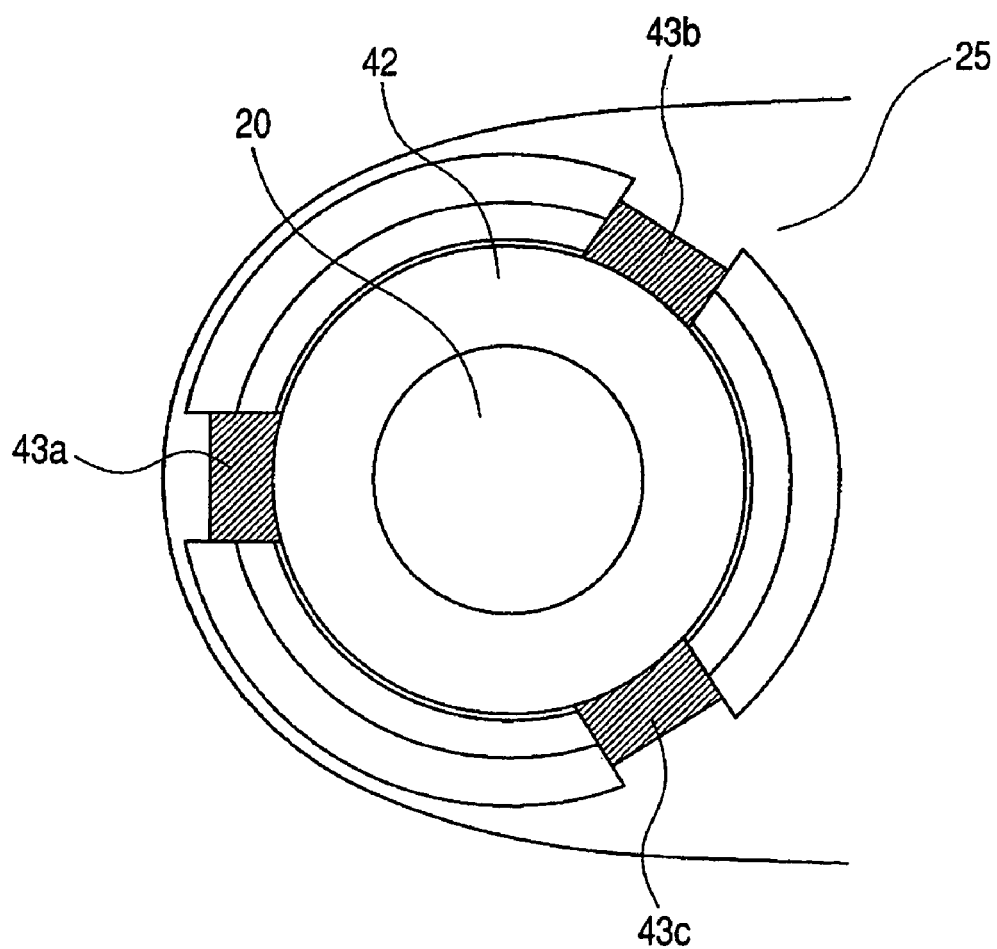

FIGS. 3A and 3B show an objective lens holding structure of Example 3. FIG. 3A is a longitudinal cross-sectional view, and FIG. 3B is a bottom view when viewed from below (i.e., showing a surface which does not face an optical disk).

A through-hole 40 for disposing an objective lens 20 is formed in a lens holding member 25. In the hole 40, an annular aperture member 42 for restricting the diameter of a light flux, which is a member separate from the lens holding member 25, is fitted and provided together with the objective lens 20.

As with Example 2, also, in the present example, an annular protection member 44b, as protection means for the objective lens 20, is provided on the upper surface of the lens holding member 25. The protection member 44b consists of a thin plate of a metallic material, and a downwardly bent portion is formed in a part thereof. Further, a coating 46, made of a material with flexibility and excellent slidability, is formed on its upper surface, and its lower surface functions as an abutting surface 41 against the objective lens 20. Assuming that the working distance of the objective lens 20 is 0.25 mm, and the vertex thereof is higher by 0.05 mm than that upper surface of the edge 34, it is sufficient that the thickness of the protection member 44b is slightly larger than the vertex height, for example, 0.08 to 0.1 mm. At this time, a clearance of 0.2 to 0.22 mm is assured between the upper surface of the protection member 44b and the cover layer 14 of the optical disk 1.

The protection member 44b is a thin plate of a metallic material with a uniform thickness produced by rolling, so that, in comparison with a molded product of a resin material, or the like, obtained by using a die, or the like, the accuracy of the thickness can be made high. Further, it is also possible to set the dispersion in the entire thickness of the protection member 44b, including the coating, to be ±0.005 mm or less. Moreover, since the rigidity of the metal plate is higher than that of a resin material, it is also possible to further reduce the thickness. In addition, it is possible to form a coating on its surface by a method utilizing the electroconductivity thereof, such as electrodeposition, electroplating, or electrostatic deposition. Furthermore, since its heat resistance is higher than that of a resin material, it is possible to bake the coating at a higher temperature, to thereby increase the adhesion of the coating.

The protection member 44b is integrated with the lens holding member 25 by inserting the bent portion at the time of forming (or molding) the lens holding member 25 and is, therefore, attached to the lens holding member 25 without using an adhesive. Alternatively, it is also possible to form an engaging portion in each of the protection member 44b and the lens holding member 25, and to attach the protection member 44b to the lens holding member 25 by the engagement. Incidentally, the protection member 44b is bonded so as to extend over the upper surface of the edge 34 and the upper surface of the lens holding member 25, so that the gap between the objective lens 20 and the inner wall of the hole 40 and all the open upper surfaces of the cutout portions 43a, 43b, 43c for adhesion formed as through-holes are closed.

The cutout portions 43a, 43b, 43c for adhesion are formed at the periphery of the hole 40 of the lens holding member 25. The cutout portions 43a, 43b, 43c for adhesion are first formed so as to have open upper surfaces and open lower surfaces. However, as described above, the open upper surfaces, which face the optical disk 1, are closed by bonding the protection member 44b.

When assembling the optical pick-up, first, the objective lens 20 and the aperture member 42 are fitted and disposed in the hole 40. Next, the edge 34 is pressed upwardly from below, through the aperture member 42, to thereby abut the upper surface of the edge 34 on the abutting surface 41, and alignment is then performed. In this state, an adhesive (shown by hatching) is injected into the cutout portions 43a, 43b, 43c for adhesion. Then, by adhering the adhesive to the side surface of the objective lens 20, the objective lens 20 is fixed together with the aperture member 42.

As explained above, in all the embodiments, a protection means (protection part 44a or protection member 44b), which has a small dispersion in thickness and is thin, is provided for the objective lens 20. Further, since a sufficient clearance is assured between the protection means and the cover layer 14 of the optical disk 1, it is possible to reduce the frequency of contact therebetween to a minimum. Moreover, at the time of assembly, no adhesion step is needed, so that the production is easy.

In addition, the cutout portions 43a, 43b, 43c for performing adhesion/fixation of the objective lens 20, each have an opening on the lower surface side which does not face the optical disk 1. That is, the upper surface which faces the optical disk 1 has no openings and is closed by the protection member 44b. Thereby, when installing the objective lens 20, it is possible to reduce adhesion of an adhesive to the protection part 44a, the protection member 44b or the objective lens 20, by injecting an adhesive from the lower surface side.

What is claimed is:

1. An optical pick-up comprising:
   an objective lens for collecting/irradiating laser light onto an optical disk; and
   an objective lens holding member for holding the objective lens,
   wherein (a) a plurality of cutout portions for injecting therein an adhesive for fixing the objective lens are provided on a side of the objective lens holding member opposite to a side thereof facing the optical disk and, at the cut out portions, an adhesive is filled in a gap between (i) a surface of the edge of the objective lens perpendicular to the optical disk and (ii) a portion of the objective lens holding member opposing the surface, and (b) a protection member is disposed on a surface of the edge opposing the optical disk and on a side of the gap opposing the optical disk.

2. The optical pick-up according to claim 1, wherein the protection member and the objective lens holding member comprise the same material and are formed integrally with each other.

3. The optical pick-up according to claim 1, wherein the protection member comprises a sheeting member having a self-adhesive layer and is bonded to the objective lens holding member.

4. The optical pick-up according to claim 1, wherein the protection member is insert molded into the objective lens holding member.

5. An optical disk device comprising:
   a spindle motor for rotating/driving an optical disk;
   a laser light source for generating laser light;
   an objective lens for collecting/irradiating the laser light onto the optical disk; and
   an objective lens holding member for holding the objective lens,
   wherein (a) a plurality of cutout portions for injecting therein an adhesive for fixing the objective lens are provided on a side of the objective lens holding member opposite to a side thereof facing the optical disk and, at the cut out portions, an adhesive is filled in a gap between (i) a surface of the edge of the objective lens perpendicular to the optical disk and (ii) a portion of the objective lens holding member opposing the surface, and (b) a protection member is disposed on a surface of the edge opposing the optical disk and on a side of the gap opposing the optical disk.

6. The optical disk device according to claim 5, wherein a distance between the objective lens and a surface of the optical disk, when the optical disk is mounted on the spindle motor, is 0.1 to 0.3 mm.

* * * * *